(12) United States Patent
Yamagata et al.

(10) Patent No.: US 11,853,625 B2
(45) Date of Patent: Dec. 26, 2023

(54) CONSUMABLES MANAGEMENT SYSTEM AND METHOD FOR MANAGING CONSUMABLES CONTAINER

(71) Applicant: SEIKO EPSON CORPORATION, Tokyo (JP)

(72) Inventors: Shinya Yamagata, Matsumoto (JP); Noriyuki Fukasawa, Matsumoto (JP); Yoshiharu Mizuno, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/176,964

(22) Filed: Mar. 1, 2023

(65) Prior Publication Data
US 2023/0280951 A1  Sep. 7, 2023

(30) Foreign Application Priority Data

Mar. 2, 2022 (JP) ................. 2022-013949

(51) Int. Cl.
*G06F 3/12* (2006.01)
*H04N 1/00* (2006.01)
*H04N 1/23* (2006.01)
*B41J 2/175* (2006.01)

(52) U.S. Cl.
CPC ........ *G06F 3/1229* (2013.01); *B41J 2/17543* (2013.01); *G06F 3/121* (2013.01); *G06F 3/1285* (2013.01); *H04N 1/00344* (2013.01); *H04N 1/2346* (2013.01); *H04N 1/2392* (2013.01)

(58) Field of Classification Search
CPC ...... G06F 3/1229; G06F 3/121; G06F 3/1285; B41J 2/17543; H04N 1/00344; H04N 1/2346; H04N 1/2392
See application file for complete search history.

(56) References Cited

U.S. PATENT DOCUMENTS

| | | | | |
|---|---|---|---|---|
| 2005/0219284 A1* | 10/2005 | Shima | ................ | B41J 2/17506 347/7 |
| 2021/0303954 A1* | 9/2021 | Sato | ...................... | G06F 3/1285 |
| 2022/0163915 A1* | 5/2022 | Taniguchi | .......... | G03G 15/0891 |
| 2022/0350546 A1* | 11/2022 | Miyazaki | .............. | G06F 3/1235 |

FOREIGN PATENT DOCUMENTS

JP          2005-284571 A      10/2005

* cited by examiner

*Primary Examiner* — Iriana Cruz
(74) *Attorney, Agent, or Firm* — Oliff PLC

(57) ABSTRACT

A consumables management system includes a plurality of printers in each of which a consumables container is installed and each of which is configured to consume consumables contained in the consumables container, and a management unit connected via a network to the plurality of printers. The management unit manages container identification information assigned to the consumables container, device identification information assigned to each of the plurality of printers, and user identification information assigned to the user of each of the plurality of printers in association with one another.

10 Claims, 5 Drawing Sheets

CYAN CARTRIDGE

| IDC → | ID: CAAAAAAA | INSTALLED IN PRINTER |
| IDC → | ID: CBBBBBBB | ALREADY DISPATCHED |
| IDC → | ID: CCCCCCCC | REFILLING IN PROGRESS |

MAGENTA CARTRIDGE

| IDC → | ID: MAAAAAAA | ALREADY DISPATCHED |
|       | ID: MBBBBBBB | INSTALLED IN PRINTER |

YELLOW CARTRIDGE

| IDC → | ID: YAAAAAAA | INSTALLED IN PRINTER |
|       | ID: YBBBBBBB | ALREADY DISPATCHED |

BLACK CARTRIDGE

| IDC → | ID: KAAAAAAA | REFILLING IN PROGRESS |
|       | ID: KBBBBBBB | NOT YET RECEIVED BY MAKER |
|       | ID: KCCCCCCC | INSTALLED IN PRINTER |

CONSUMABLES MANAGEMENT SYSTEM AND METHOD FOR MANAGING CONSUMABLES CONTAINER

The present application is based on, and claims priority from JP Application Serial Number 2022-031949, filed Mar. 2, 2022, the disclosure of which is hereby incorporated by reference herein in its entirety.

BACKGROUND

1. Technical Field

The present disclosure relates to a consumables management system and a method for managing a consumables container.

2. Related Art

There has been a system of managing the number of refills when an ink cartridge installed in a printer is refilled with ink. A refill management system disclosed in JP-A-2005-284571 obtains the identification information and the remaining ink level of an ink cartridge from a printer via a network. If the obtained remaining ink level is greater than the remaining ink level registered in a remaining level management table, the refill management system increments, by one, the number of determined refills for the ink cartridge of the identification information. If the number of determined refills exceeds a limit on the number of refills, the refill management system sends an error message via a network to the printer.

In addition, the refill management system disclosed in JP-A-2005-284571 accesses a server managed by a printer manufacturer, via a network, to obtain the number of maker refills that corresponds to the identification information of the ink cartridge. The number of maker refills is the number of times a printer manufacturer has refilled, with ink, the ink cartridge to which the identification information is assigned. If the number of determined refills is above the number of maker refills, the refill management system sends an error message via a network to the printer.

As a result, adverse effects on the printer caused by an excess in the number of refills for the same consumables container and by refilling with ink performed by a person other than the printer manufacturer are reduced.

The refill management system disclosed in JP-A-2005-284571 does not manage information on the printer main body and the user. That is, in the techniques in JP-A-2005-284571, ink cartridges for ink refilling may flow irrespective of the printer main body and the user. Ink cartridges refilled with ink and reused, which are different from unused ink cartridges, may have various qualities in accordance with the past usage history. Therefore, ink cartridges that are acquired by the user as ink cartridges refilled with ink are of various qualities.

SUMMARY

According to an aspect of the present disclosure, a consumables management system is provided. This consumables management system includes a plurality of printers in each of which a consumables container is installed and each of which is configured to consume consumables contained in the consumables container, and a management unit connected via a network to the plurality of printers. The management unit is configured to manage container identification information assigned to the consumables container, device identification information assigned to each of the plurality of printers, and user identification information assigned to a user of each of the plurality of printers in association with one another.

BRIEF DESCRIPTION OF THE DRAWINGS

FIG. 8 is a diagram depicting output displayed on a display panel.

DESCRIPTION OF EXEMPLARY EMBODIMENTS

A. Embodiment

A1. Configuration of Consumables Management System

Figure 1:
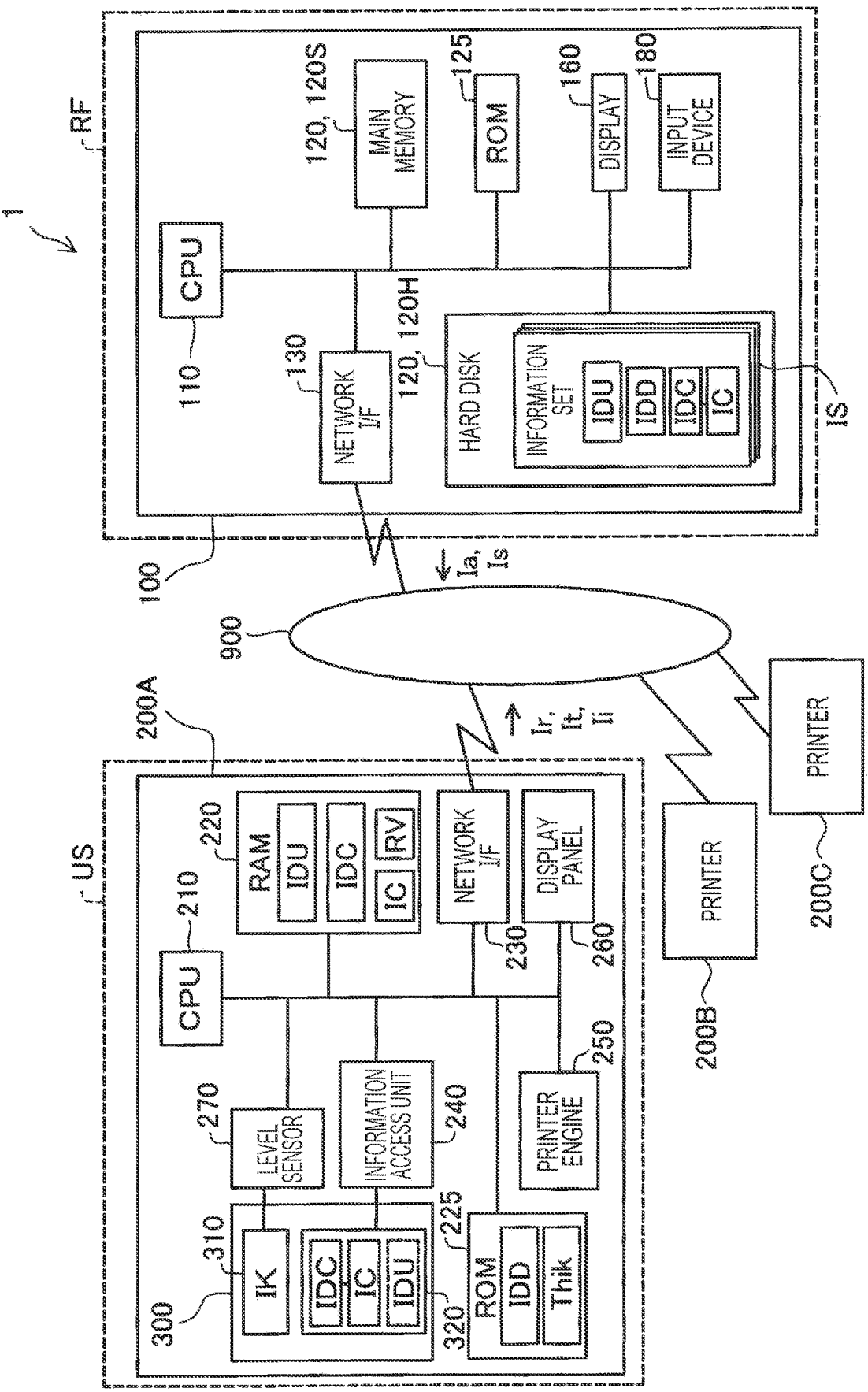
FIG. 1 is a block diagram illustrating a consumables management system according to an embodiment of the present disclosure.

FIG. 1 is a block diagram illustrating a consumables management system 1 according to an embodiment of the present disclosure. The consumables management system 1 includes a management unit 100, printers 200A, 200B, and 200C, and an ink cartridge 300. However, printers are referred to as printers 200 when the printers 200A, 200B, and 200C are not distinguished from one another.

The ink cartridge 300 contains ink IK. The ink cartridge 300 is installed in any of the printers 200A, 200B, and 200C to supply the ink IK to the printer. A plurality of ink cartridges 300 containing ink having different colors from each other are installed in one printer. However, in the present embodiment, ink cartridges are referred to as the ink cartridges 300 regardless of the color of the contained ink IK.

After the ink IK of the ink cartridge 300 has been consumed in the printer 200, the ink cartridge 300 is sent to a refiller RF and is refilled with the ink IK by the refiller RF. The refiller RF is, for example, the manufacturer of the printer 200. A plurality of ink cartridges 300 containing the same ink, which are installed in the same printer, may move cyclically between a user US and the refiller RF. Therefore, the user US may continue to use the printer 200 without waiting for the refiller RF to refill the ink cartridge 300 with the ink IK and to return the ink cartridge 300.

The ink cartridge 300 includes an ink containing portion 310 and a container storage 320. The ink containing portion 310 is capable of containing the ink IK. The container storage 320 is capable of storing various types of information. The container storage 320 is specifically a semiconductor memory. The container storage 320 stores, for example, container identification information IDC assigned to the ink cartridge 300 and information IC on the type of ink stored in the ink cartridge 300. The type of ink is, for example, the color of ink.

Each of the printers 200A, 200B, and 200C, in which the ink cartridge 300 is installed and to which the ink IK contained in the ink cartridge 300 is supplied, consumes the ink IK. The configurations and functions of the printers 200A, 200B, and 200C are the same. The printers 200A, 200B, and 200C are connected to the management unit 100 via a communication network 900. Hereafter, a description will be given of the printer 200A as representing the printers 200A, 200B, and 200C.

The printer 200A is owned by the user US. The printer 200A is a printer that the user US uses. The printer 200A includes a central processing unit (CPU) 210, which is a processor, a random-access memory (RAM) 220, a read-only memory (ROM) 225, a network interface 230, an information access unit 240, a printer engine 250, a display panel 260, and a level sensor 270.

The CPU 210 receives data and instructions from the information access unit 240, the display panel 260, the level sensor 270, and the network interface 230 and loads, on the RAM 220, a computer program stored in the ROM 225 and executes the computer program, thereby implementing various functions. More specifically, the functions are implemented using the information access unit 240, the printer engine 250, the display panel 260, and the network interface 230.

The RAM 220 is capable of storing a remaining ink level RV of each ink cartridge 300 and user identification information IDU. The remaining ink level RV is information indicating the level of remaining ink contained in the ink containing portion 310 of the ink cartridge 300.

The user identification information IDU is information assigned to the user of each of the printers 200A, 200B, and 200C such that the printers 200A, 200B, and 200C are identifiable from one another. When the printer 200 is initially started, the user US is prompted through a computer coupled to the printer 200 to perform user registration. During processing of user registration, the user identification information IDU is determined or selected via a computer and is stored in the RAM 220 of the printer 200.

The ROM 225 stores the device identification information IDD. The device identification information IDD is information assigned to each of the printers 200A, 200B, and 200C such that the printers 200A, 200B, and 200C are distinguishable from one another. The device identification information IDD is stored in the ROM 225 in manufacturing each of the printers 200A, 200B, and 200C.

The network interface 230 intermediates communication via the communication network 900 between components outside the printer 200A and the printer 200A.

The information access unit 240 is capable of accessing the container storage 320 of the ink cartridge 300 installed in the printer 200A to read out information from the container storage 320 and write information to the container storage 320. For example, the information access unit 240 accesses the container storage 320 to read out the container identification information IDC.

The printer engine 250 is hardware that performs printing. The printer engine 250 is controlled by the CPU 210 to perform printing. More specifically, the printer engine 250, to which the ink IK is supplied from the ink cartridge 300, ejects ink droplets onto a printing medium.

The display panel 260 is a device capable of outputting information. The display panel 260 is further capable of receiving information. The display panel 260 is specifically a liquid crystal display including a touch panel. The display panel 260 is controlled by the CPU 210 to display characters and images. The display panel 260 also receives an instruction from a user via the touch panel.

The level sensor 270 is a sensor that detects the level of remaining ink contained in the ink containing portion 310 of the ink cartridge 300. The level sensor 270 includes a light-emitting diode (LED) and a photosensor. The ink cartridge 300 includes a prism exposed both outside the ink cartridge 300 and within the ink containing portion 310 of the ink cartridge 300. The level sensor 270 emits light from the LED toward the prism and receives reflected light using the photosensor, thus detecting the level of remaining ink contained in the ink containing portion 310. Information on the level of remaining ink detected by the level sensor 270 is written as the remaining ink level RV to the RAM 220 by the CPU 210.

The management unit 100 manages the state of flow of the ink cartridge 300. The management unit 100 is used by the refiller RF. The management unit 100 is connected to the printers 200A, 200B, and 200C via the communication network 900. The management unit 100 includes a CPU 110, which is a processor, a RAM 120, a ROM 125, a network interface 130, a display 160, and an input device 180. The RAM 120 includes a main memory 120S, which is a semiconductor memory, and a hard disk 120H, which is an auxiliary storage device.

The CPU 110 receives data and instructions from the input device 180 and the network interface 130 and loads a computer program stored in the ROM 125 or on the hard disk 120H into the main memory 120S and executes the computer program, thereby implementing various functions. More specifically, the functions are implemented using the display 160 and the network interface 130.

The hard disk 120H stores a plurality of information sets IS. Each information set IS includes a plurality of pieces of the container identification information IDC, one or more pieces of the device identification information IDD, and one piece of the user identification information IDU in association with one another. That is, one information set IS corresponds to one piece of the user identification information IDU. The information set IS includes, in association with the container identification information IDC, information on ink contained in the ink cartridge 300 having the container identification information IDC.

The network interface 130 intermediates communication via the communication network 900 between components outside the management unit 100 and the management unit 100.

The display 160 is a device capable of outputting information. The display 160 is specifically a liquid crystal display. The display 160 is controlled by the CPU 110 to display characters and images.

The input device 180 receives an operation of the user and transmits an instruction of the user to the CPU 110. The input device 180 is specifically a keyboard and a mouse.

Figure 2:
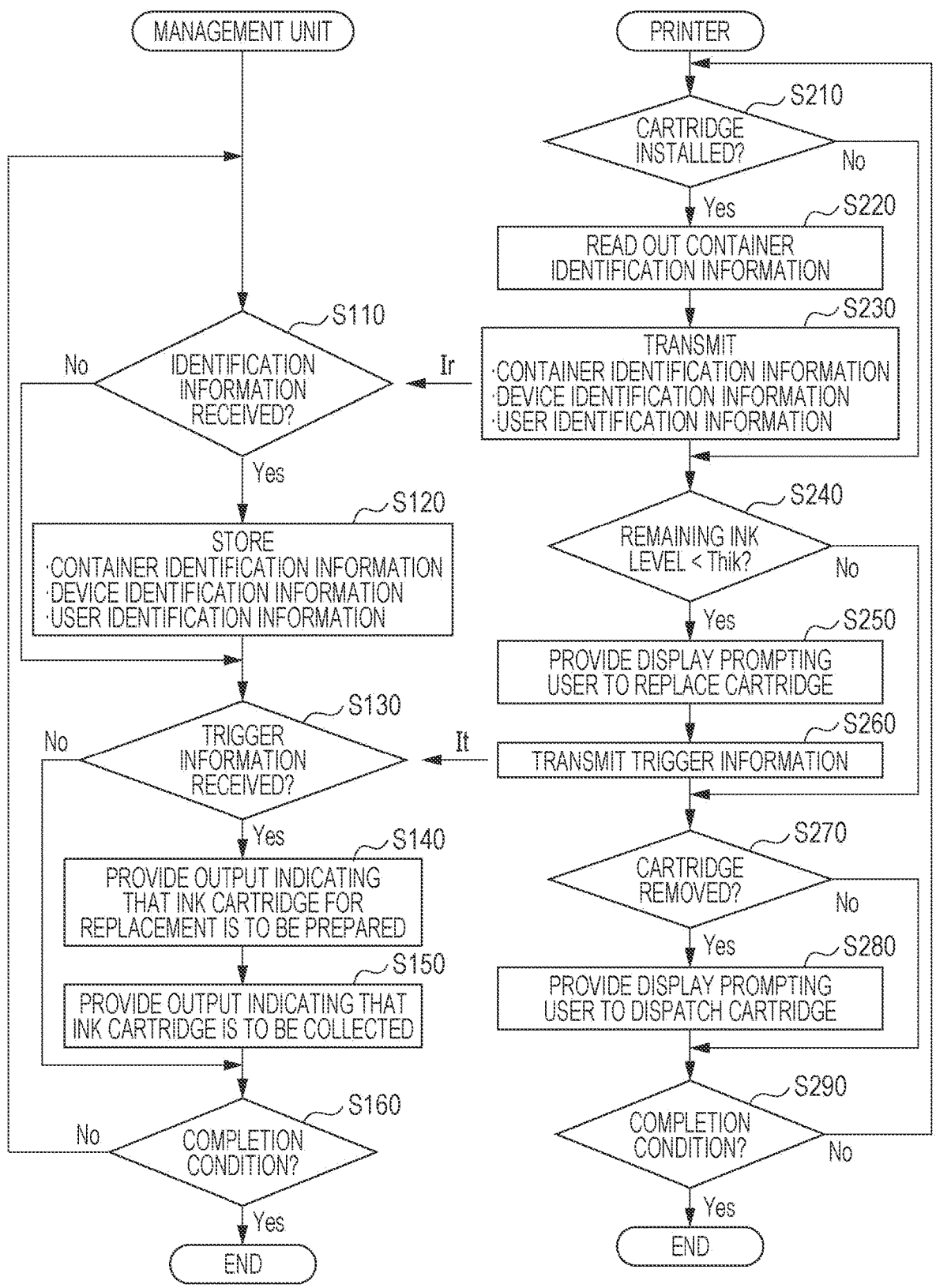
FIG. 2 is a flowchart illustrating operations of a management unit and a printer in a process of causing ink cartridges to move cyclically between a user and a refiller.

A2. Operations of Consumables Management System (1) Process of Causing Ink Cartridges to Move Cyclically FIG. 2 is a flowchart illustrating operations of the management unit 100 and the printer 200 in a process of causing the ink cartridges 300 to move cyclically between the user US and the refiller RF. By performing the process in FIG. 2, a method for managing an ink cartridge is implemented. Steps S110 to S160 illustrated in FIG. 2 are executed by the CPU 110 of the management unit 100. Steps S210 to S290 illustrated in FIG. 2 are executed by the CPU 210 of the printer 200A. However, steps S210 to S290 illustrated in FIG. 2 are also executed by the CPU 210 of the printer 200B and the CPU 210 of the printer 200C (refer to the center at the bottom of FIG. 1).

At step S210, the CPU 210 of the printer 200A determines whether the ink cartridge 300 is newly installed in the printer 200. New installation of the ink cartridge 300 in the printer 200 may be detected, for example, in response to a new instance of the container storage 320 capable of being accessed by the information access unit 240 (refer to the left portion in the middle of FIG. 1). If the newly installed ink cartridge 300 is present, the process proceeds to step S220. If the newly installed ink cartridge 300 is absent, the process proceeds to step S240.

At step S220, using the information access unit 240, the CPU 210 of the printer 200A reads out the container identification information IDC in the container storage 320 of the ink cartridge 300 (refer to the left portion in the middle of FIG. 1). The CPU 210 further reads out the information IC on the type of ink stored in the ink cartridge 300 from the container storage 320.

At step S230, the CPU 210 of the printer 200A stores the read-out container identification information IDC together with the information IC on the type of ink of the ink cartridge 300 in the RAM 220 (refer to the center of FIG. 1). In the RAM 220 of the printer 200A, the container identification information IDC of the ink cartridge 300 that has been used in the printer 200A is stored together with the information IC on the type of ink. Regarding the ink cartridge 300 installed in the printer 200A, an installation flag associated with the container identification information IDC of the ink cartridge 300 is set to ON.

The CPU 210 of the printer 200A transmits the read-out container identification information IDC and the ink information IC, together with the device identification information IDD assigned to the printer 200A and the user identification information IDU assigned to the user US of the printer 200A, to the management unit 100. These pieces of identification information, together with information indicating the presence of the newly installed ink cartridge 300, are transmitted as update information Ir to the management unit 100 via the communication network 900 (refer to the center of FIG. 1).

At step S240, the CPU 210 of the printer 200A determines whether the amount of the ink IK contained in any of the ink cartridges 300 installed in the printer 200A is below a predetermined amount Thik. The amount of the ink IK below the threshold Thik may be detected, for example, by determining that the amount of light received by the level sensor 270 has risen above a predetermined threshold amount of light (refer to the left portion at the top of FIG. 1). If each of the amounts of the ink IK of all the ink cartridges 300 installed in the printer 200A is greater than or equal to the threshold Thik, the process proceeds to step S270. If the ink cartridge 300 of which the amount of the ink IK is below the threshold Thik is present, the process proceeds to step S250.

At step S250, using the display panel 260, the CPU 210 of the printer 200A provides output 0250 that prompts the user US of the printer 200A to replace the ink cartridge 300 of which the amount of the ink IK is below the threshold Thik (refer to the center at the bottom of FIG. 1).

Figure 3:
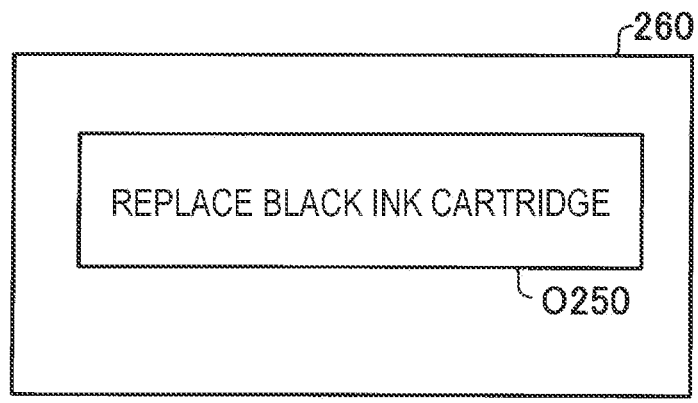
FIG. 3 is a diagram depicting output that prompts the user to replace the ink cartridge.

FIG. 3 is a diagram depicting the output 0250 that prompts the user US to replace the ink cartridge 300. For example, if, at step S240 in FIG. 2, it is detected that the amount of the ink IK of the ink cartridge 300 containing black ink has fallen below the threshold Thik, at step S250, the output 0250 depicted in FIG. 3 is displayed on the display panel 260.

Performing such processing enables the user US of the printer 200A to know that when the amount of the ink IK contained in the ink cartridge 300 installed in the printer 200A is below the predetermined amount Thik, the ink cartridge 300 is to be replaced.

At step S260 in FIG. 2, the CPU 210 of the printer 200A transmits trigger information It to the management unit 100 via the communication network 900 (refer to the center of FIG. 1). The trigger information It includes the container identification information IDC assigned to the ink cartridge 300 containing the ink IK the amount of which is below the threshold Thik.

At step S270, the CPU 210 of the printer 200A determines whether the ink cartridge 300 installed in the printer 200A has been removed. Removal of the ink cartridge 300 installed in the printer 200A may be detected, for example, in response to a new instance of the container storage 320 incapable of being accessed by the information access unit 240 (refer to the left portion in the middle of FIG. 1). If the newly removed ink cartridge 300 is absent, the process proceeds to step S290. If the newly removed ink cartridge 300 is present, an installation flag associated with the container identification information IDC of the ink cartridge 300 is set to OFF, and the process proceeds to step S280.

At step S280, using the display panel 260, the CPU 210 of the printer 200A provides output 0280 that prompts the user US of the printer 200A to dispatch the removed ink cartridge 300 to the refiller RF.

Performing such processing enables the user US to know that the ink cartridge 300 is to be dispatched to the refiller RF. As a result, the ink cartridges 300 may move efficiently and cyclically between the user US and the refiller RF.

Figure 4:
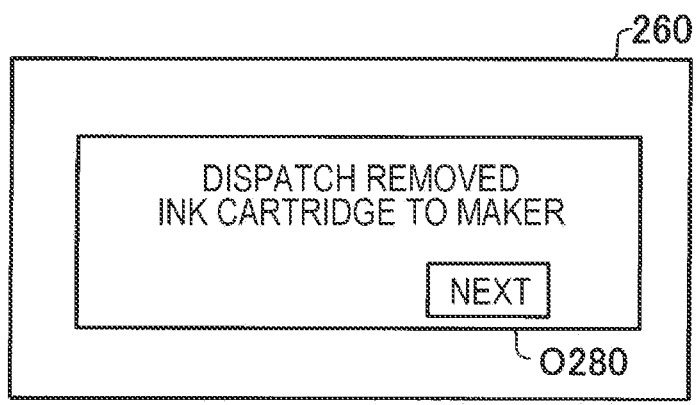
FIG. 4 is a diagram depicting output that prompts the user to dispatch the ink cartridge to the refiller.

FIG. 4 is a diagram depicting the output 0280 that prompts the user US to dispatch the ink cartridge 300 to the refiller RF. The output 0280 includes a button displaying "Next". When the user depresses the "Next" button, a specific procedure for dispatching the ink cartridge 300 to the refiller RF is displayed on the display panel 260. Then, under an instruction from the user US, a destination address label addressed to the refiller RF is printed by the printer engine 250. The destination address label addressed to the refiller RF is printed using ink of the ink cartridge 300 installed in the printer 200A. When the ink cartridge 300 of black is installed in the printer 200A, the destination address label is printed using black ink. When the ink cartridge 300 of black is not installed in the printer 200A, the destination address label is printed, for example, using a combination of a plurality of color inks, such as a combination of cyan and magenta.

The user US who has seen the output 0280, which prompts the user US to dispatch the ink cartridge 300 to the refiller RF, dispatches the ink cartridge 300 to the refiller RF. At this point, a destination address label printed by the printer 200A may be used.

At step S290 in FIG. 2, the CPU 210 of the printer 200A determines whether a termination condition is satisfied. The termination condition is, for example, that a switch for powering off the printer 200 has been pressed. If the termination condition is not satisfied, the process returns to step S210. If the termination condition is satisfied, the process terminates.

At step S110 in FIG. 2, the CPU 110 of the management unit 100 determines whether the container identification information IDC, the device identification information IDD, and the user identification information IDU, as well as the information indicating the presence of the newly installed ink cartridge 300, have been received as the update information Ir from the printer 200. If these pieces of identification information have not been received, the process proceeds to step S130. If these pieces of identification information have been received, the process proceeds to step S120.

At step S120, the CPU 110 of the management unit 100 stores the container identification information IDC and the ink information IC, in association with the device identification information IDD and the user identification information IDU, on the hard disk 120H (refer to the center at the bottom of FIG. 1). More specifically, the CPU 110 stores the received device identification information IDD and the received container identification information IDC and ink information IC in association with one another, as a part of the information set IS associated with the received user identification information IDU, thereby updating the information set IS.

At step S130, the CPU 110 of the management unit 100 determines whether the trigger information It has been received from the printer 200. If the trigger information It has not been received, the process proceeds to step S160. If the trigger information It has been received, the process proceeds to step S140.

At step S140, the CPU 110 of the management unit 100 identifies, in accordance with the information set IS on the hard disk 120H, the user identification information IDU associated with the container identification information IDC included in the trigger information It (refer to the center at the bottom of FIG. 1). Then, the CPU 110 of the management unit 100 identifies the ink cartridge 300 to which another container identification information IDC associated with the identified user identification information IDU is assigned and that contains ink of the same color as that of ink in the ink cartridge 300 of the container identification information IDC included in the trigger information It. Thereafter, using the display 160, the CPU 110 of the management unit 100 provides output 0140 indicating that the identified ink cartridge 300 is to be prepared.

Figure 5:
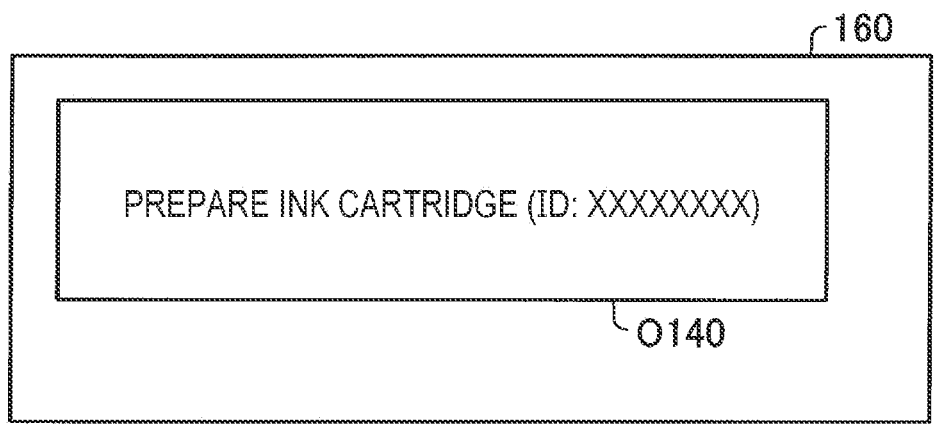
FIG. 5 is a diagram depicting output indicating that the ink cartridge is to be prepared.

FIG. 5 is a diagram depicting the output 0140 indicating that the ink cartridge 300 is to be prepared. For example, if, at step S130 in FIG. 2, the identified another container identification information IDC is "XXXXXXXX", at step S140, the output 0140 depicted in FIG. 5 is displayed on the display 160. In this case, the container identification information IDC included in the trigger information It is different from "XXXXXXXX" (refer to S130 in FIG. 2). The ink cartridge 300 having the container identification information IDC "XXXXXXXX" contains the same ink as the ink of the ink cartridge 300 having the container identification information IDC included in the trigger information It.

Performing such processing enables the refiller RF to know which ink cartridge 300 is to be prepared. As a result, the ink cartridges 300 may move efficiently and cyclically between the user US and the refiller RF.

At step S150 in FIG. 2, using the display 160, the CPU 110 of the management unit 100 provides output 0150 indicating that the ink cartridge 300 to which the container identification information IDC included in the trigger information It is assigned is to be collected from the user US to whom the user identification information IDU associated with this container identification information IDC is assigned (refer to the right portion at the bottom of FIG. 1). This processing is performed with reference to the information set IS on the hard disk 120H, as performed at step S140.

Figure 6:
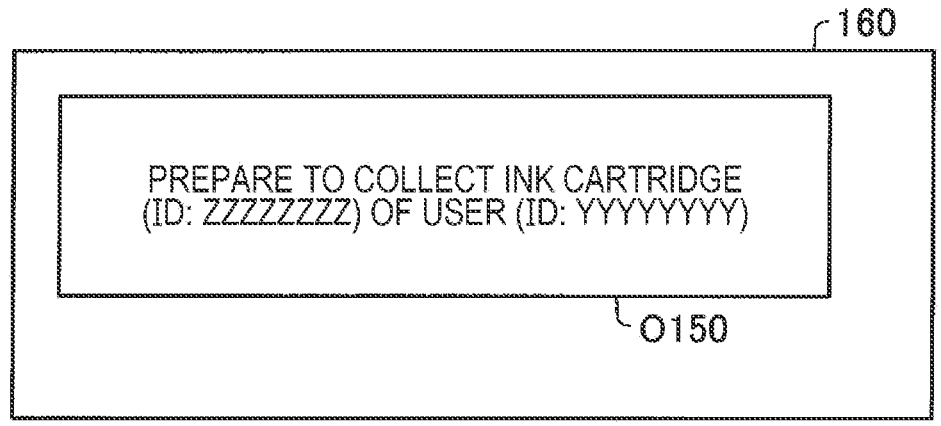
FIG. 6 is a diagram depicting output indicating that the ink cartridge is to be collected from the user.

FIG. 6 is a diagram depicting the output 0150 indicating that the ink cartridge 300 is to be collected from the user US. For example, when the container identification information IDC included in the trigger information It received at step S130 in FIG. 2 is "ZZZZZZZZ" and the user identification information IDU identified with reference to the information set IS is "YYYYYYYY", at step S150, the output 0150 depicted in FIG. 6 is displayed on the display 160.

Performing such processing enables the refiller RF to know the ink cartridge 300 to be collected from the user US. For example, the refiller RF may transmit, to the user US, an e-mail prompting the user US to dispatch a used ink cartridge 300.

In response to receiving, from the user US, the used ink cartridge 300 containing the ink IK the amount of which is below the threshold Thik, the refiller RF verifies the quality of each component of the ink cartridge 300. If each component of the ink cartridge 300 is of sufficient high quality, the remanufacturer RF fills the ink cartridge 300 with the same ink as the ink that has been contained in the ink cartridge 300. Then, the refiller RF sends, to the user US, the ink cartridge 300 that has been refilled.

If part of the received ink cartridge 300 is not of sufficient high quality, the refiller RF replaces the part and then fills the ink cartridge 300 with the same ink as the ink that has been contained in the ink cartridge 300. Then, the refiller RF sends, to the user US, the ink cartridge 300 that has been refilled.

If, in the ink cartridge 300, at least a certain percentage of components is not of sufficient high quality, the refiller RF discards the ink cartridge 300 and informs the user US accordingly.

(2) Process of Verifying Status of Ink Cartridge

Figure 7:
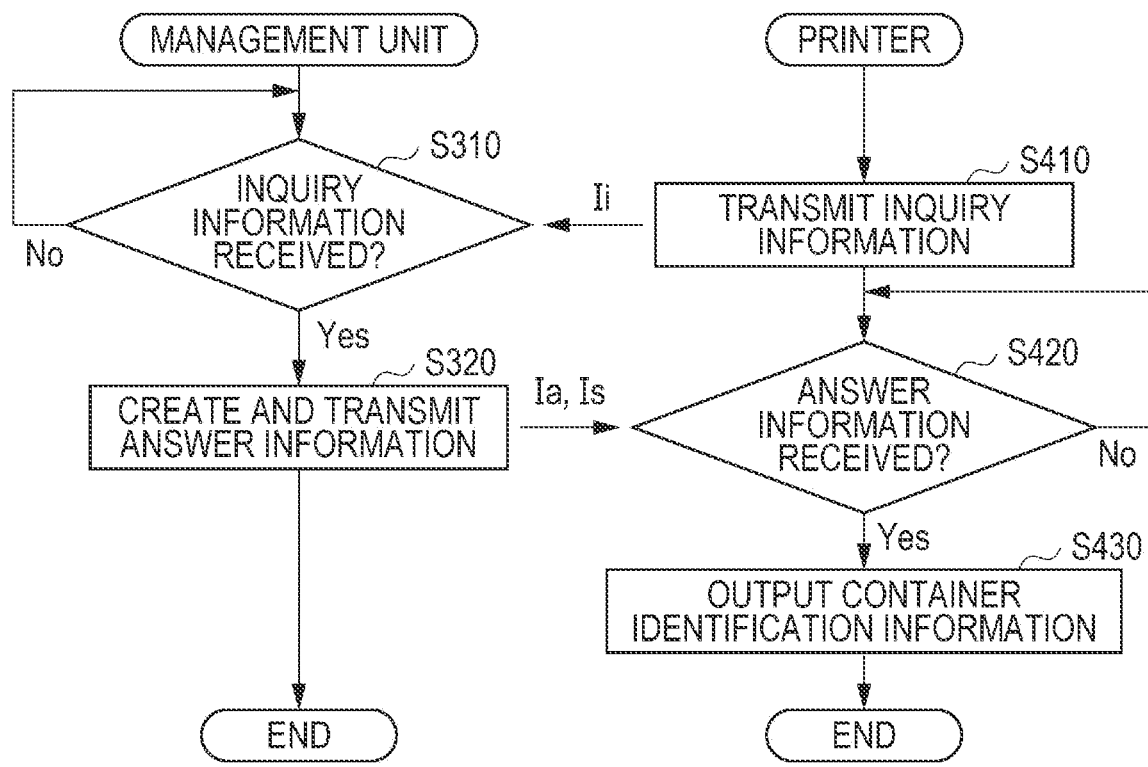
FIG. 7 is a flowchart illustrating operations of the management unit and the printer in a process of verifying the status of the ink cartridge.

FIG. 7 is a flowchart illustrating operations of the management unit 100 and the printer 200 in a process of verifying the status of an ink cartridge. Steps S310 to S320 illustrated in FIG. 7 are executed by the CPU 110 of the management unit 100. Steps S410 to S430 illustrated in FIG. 7 are executed by the CPU 210 of the printer 200A. However, steps S410 to S430 illustrated in FIG. 7 are also executed by the CPU 210 of the printer 200B and the CPU 210 of the printer 200C (refer to the center at the bottom of FIG. 1).

At step S410, in response to an instruction from the user US via the display panel 260, the CPU 210 of the printer 200A transmits, to the management unit 100, inquiry information Ii including the device identification information IDD assigned to the printer 200A. The inquiry information Ii includes information indicating a request for the status information of an ink cartridge. Specifically, the CPU 210 reads out the device identification information IDD from the ROM 225 (refer to the left portion in the middle of FIG. 1). The CPU 210 transmits the inquiry information Ii including the read-out device identification information IDD to the management unit 100 via the network interface 230.

At step S310, the CPU 110 of the management unit 100 determines whether the inquiry information Ii has been received from the printer 200. If the inquiry information Ii has not been received, step S310 is repeated at certain time intervals. If the inquiry information Ii has been received, the process proceeds to step S320.

At step S320, the CPU 110 of the management unit 100 identifies, in accordance with the information set IS on the hard disk 120H, one or more pieces of container identification information IDC associated with the device identification information IDD included in the inquiry information Ii (refer to the center at the bottom of FIG. 1). The CPU 110 transmits answer information Ia including the identified container identification information IDC to the printer 200A that has transmitted the inquiry information Ii.

The answer information Ia includes state information Is for a respective one of the ink cartridges 300 of one or more pieces of container identification information IDC associated with the device identification information IDD included in the inquiry information Ii. The state information Is indicates one of a plurality of states, including states where the refiller RF is in possession of the ink cartridge 300 and where the ink cartridge 300 was dispatched from the refiller RF to the user US. The answer information Ia further includes, for the respective one of the ink cartridges 300 of one or more pieces of container identification information IDC associated with the device identification information IDD included in the inquiry information Ii, the ink information IC on ink contained in the ink cartridge 300.

At step S420, the CPU 210 of the printer 200A determines whether the printer 200A has received the answer information Ia. If the answer information Ia has not been received, step S420 is repeated at certain time intervals. If the answer information Ia has been received, the process proceeds to step S430.

At step S430, using the display panel 260, the CPU 210 of the printer 200A outputs one or more pieces of container identification information IDC included in the answer information Ia.

More specifically, using the display panel 260, the CPU 210 of the printer 200A outputs, in accordance with the state information Is included in the answer information Ia, the state indicated by the state information Is for the ink cartridge of a respective one of one or more pieces of container identification information IDC included in the answer information Ia, regarding whether the refiller RF is in possession of the ink cartridge 300 or whether the ink cartridge 300 was dispatched from the refiller RF to the user US.

FIG. 8 is a diagram depicting output O430 displayed on the display panel 260 at step S430. For example, at step S320 in FIG. 7, when, among one or more pieces of container identification information IDC associated with the device identification information IDD included in the inquiry information Ii, three pieces of container identification information IDC each correspond to the ink information IC indicating cyan ink, two pieces of container identification information IDC each correspond to the ink information IC indicating magenta ink, two pieces of container identification information IDC each correspond to the ink information IC indicating yellow ink, and three pieces of container identification information IDC each correspond to the ink information IC indicating black ink, the output O430 depicted in FIG. 8 is displayed on the display panel 260. The output O430 displays, according to the type of ink, whether the refiller RF is in possession of the ink cartridge 300 and whether the ink cartridge 300 was dispatched from the refiller RF to the user US.

For example, regarding the ink cartridge 300 for which installation in the printer 200A is ascertained by the management unit 100 through step S110 in FIG. 2, a notification of "Installed in printer" is displayed together with the container identification information IDC of the ink cartridge 300. The notification of "Installed in printer" may be displayed based on an installation flag in the RAM 220 of the printer 200A.

Regarding the ink cartridge 300 that the refiller RF has received from the user US and has not yet dispatched to the user US, that is, the ink cartridge 300 of which the refiller RF is in possession, a notification "Refilling in progress" is displayed together with the container identification information IDC of the ink cartridge 300. The state information Is regarding the ink cartridge 300 that the refiller RF has received from the user US and has not yet dispatched to the user US is input via the input device 180 to the management unit 100 by the refiller RF. The state information Is is stored as a part of the information set IS on the hard disk 120H (refer to the right portion at the bottom of FIG. 1).

Regarding the ink cartridge 300 that was completely refilled with ink and was dispatched to the user US by the refiller RF, a notification "Already dispatched" is displayed together with the container identification information IDC of the ink cartridge 300. The state information Is regarding the ink cartridge 300 that was dispatched to the user US is input via the input device 180 to the management unit 100 by the refiller RF. The state information Is is stored as a part of the information set IS on the hard disk 120H (refer to the right portion at the bottom of FIG. 1).

Regarding the ink cartridge 300 for which it is ascertained by the management unit 100 through step S130 in FIG. 2 that the remaining ink level is below the threshold Thik and of which the refiller RF is not in possession, a notification "Not yet received by maker" is displayed together with the container identification information IDC of the ink cartridge 300. That is, regarding the used ink cartridge 300 in such a manner, the user US is in possession of the used ink cartridge 300 in some case and the refiller RF is in possession of the used ink cartridge 300 in another case. In addition, regarding the ink cartridge 300 filled with the ink IK, the refiller RF is in possession of the ink cartridge 300 in some case and the user US is in possession of the ink cartridge 300 in another case.

Performing such processing enables the user US to know the ink cartridges 300 associated with the printer 200A. Then, the user US may know the state of each of the ink cartridges 300 that are associated with the printer 200A and that move cyclically between the user US and the refiller RF.

A3. Advantageous Effects of Consumables Management System

The refiller RF who obtains the used ink cartridge 300 and refills this ink cartridge 300 with the ink IK may perform the following process using the consumables management system 1 according to the present embodiment. That is, the ink cartridge 300 refilled with the ink IK may be provided, as the ink cartridge 300 to be installed in the printer 200A having the device identification information IDD associated with the container identification information IDC of this ink cartridge 300, to the user US having the user identification information IDU associated with the container identification information IDC of this ink cartridge 300. As a result, the user US is provided with the ink cartridge 300 that has been used by himself, instead of being provided with the ink cartridge 300 of degraded quality because of use by another user.

In the consumables management system 1 according to the present embodiment, the user US recognizes the ink cartridge 300 moving cyclically between the user US and the refiller RF as the user's own ink cartridge 300. Then, even if the ink cartridge 300 refilled with the ink IK has a defect, the user US recognizes in many cases that the defect results from his own action. Therefore, the user US may overlook such a defect in the ink cartridge 300. In contrast, when the ink cartridge 300 moves cyclically between a plurality of unspecified users US and the refiller RF, it is hard for each user US to overlook a slight defect in the ink cartridge 300 refilled with the ink IK. Therefore, at an earlier stage, that is, at a stage where the ink cartridge 300 is slightly defected, the ink cartridge 300 is discarded or otherwise disassembled and recovered as a resource. However, in the consumables management system 1 according to the present embodiment, the user US overlooks some defect in the ink cartridge 300. Therefore, the duration of use of the ink cartridge 300 until the ink cartridge 300 is discarded or otherwise disassembled and recovered as a resource may be set to a long duration. This may reduce the load on the environment imposed by the ink cartridge 300 from the time of manufacture of the ink cartridge 300 until the ink cartridge 300 is discarded.

The ink cartridge 300 according to the present embodiment is also referred to as a consumables container. The ink IK is also referred to as consumables. The communication network 900 is also referred to as a network. The RAM 220 and the ROM 225 are also referred to as storage devices. The display panel 260 is also referred to as a device output unit. The hard disk 120H is also referred to as a management storage. The display 160 is also referred to as a management output unit.

B. Other Embodiments

B1. First Other Embodiment (1) In the embodiment described above, description of the charge for refilling the ink cartridge 300 with ink is omitted. The charge for refilling the ink cartridge 300 with ink may be made each time the user US requests the refiller RF to perform refilling or may be made according to a subscription agreement under which refilling is available for a fixed period of time an unlimited number of times. When the subscription agreement is made, the user identification information IDU may be information that enables the subscription agreement to be identified.

(2) At step S210 in FIG. 2 according to the embodiment described above, the ink cartridge 300 is newly installed in the printer 200A. The ink cartridge 300 to be newly installed in the printer 200 may be purchased at an average actual store or a store on the Web by the user US. In addition, the ink cartridge 300 to be newly installed in the printer 200 may be directly purchased from a manufacturer of the printer 200 who also serves as the refiller RF. The user US may purchase the ink cartridge 300 containing no ink and send this ink cartridge 300 to the refiller RF to request that the ink cartridge 300 be filled with ink. In addition, when the management unit 100 receives the trigger information It, the manufacturer of the printer 200 who also serves as the refiller RF may be triggered to fill an empty ink cartridge 300 with ink and send the ink cartridge 300 filled with ink to the user US, who is the other party to the subscription agreement.

(3) In the embodiment described above, the display panel 260 is specifically a liquid crystal display including a touch panel (refer to the center at the bottom of FIG. 1). However, the device output unit included in the printer may be a display of a computer coupled to the printer. The device output unit included in the printer may be a smartphone, or a smart speaker, that is coupled to the printer.

(4) In the embodiment described above, the container storage 320 of the ink cartridge 300 stores the container identification information IDC assigned to the ink cartridge 300 and the ink information IC of ink stored in the ink cartridge 300 (refer to the left portion at the top of FIG. 1). However, the container storage 320 of the ink cartridge 300 may further store the user identification information IDU of the user US who has purchased this ink cartridge 300. When the ink cartridge 300 is installed in the printer 200 for the first time or when the ink cartridge 300 is purchased by the user US, the user identification information IDU may be stored in the container storage 320 of the ink cartridge 300. In FIG. 1, the user identification information IDU stored in the container storage 320 is indicated by a dashed line.

(5) In the embodiment described above, the information set IS includes, in association with the container identification information IDC, the ink information IC of ink contained in the ink cartridge of this container identification information IDC (refer to the right portion at the bottom of FIG. 1). However, the container identification information IDC is not limited to being managed in association with the ink information IC contained in the ink cartridge 300 of this container identification information IDC. In such a case, for example, the ink cartridge 300 may be washed prior to ink pre-filling and then be filled with ink of a type different from that of the ink with which the ink cartridge 300 has been filled.

(6) In the embodiment described above, when the amount of the ink IK is below the threshold Thik, the output O250 that prompts the user US to replace the ink cartridge 300 is provided, and the trigger information It is transmitted to the management unit 100 (refer to S250 and S260 in FIG. 2 and FIG. 3). However, the ink threshold serving as a trigger for the output O250 that prompts the user US to replace the ink cartridge 300 may differ from the ink threshold serving as a trigger for the trigger information It that is transmitted to the management unit 100.

(7) In the embodiment described above, the refiller RF is the manufacturer of the printer 200 (refer to the right part of FIG. 1). However, the refiller may be a provider who provides a service of refilling a consumables container with consumables and does not manufacture a printer.

(8) At step S280 in FIG. 2 in the embodiment described above, using the display panel 260, the CPU 210 of the printer 200A provides the output O280 that prompts the user US to dispatch the removed ink cartridge 300 to the refiller RF. However, the dispatching address of the ink cartridge 300 may be an agent for the refiller RF.

(9) In the embodiment described above, one ink cartridge 300 moves cyclically between the specific user US and the refiller RF. As the ink cartridges 300 used as such, the ink cartridges 300 having differently patterned and colored appearances while having the same structure may be prepared. In such a case, the user US may purchase the ink cartridge 300 to which a favorite pattern and a favorite color are added, and repeatedly use the purchased ink cartridge 300.

(10) In the embodiment described above, the management unit 100 is used by the refiller RF (refer to the right portion of FIG. 1). The management unit 100 may be a server or may be implemented by a plurality of computers and storage devices on a network.

B2. Second Other Embodiment (1) In the embodiment described above, if the newly installed ink cartridge 300 is present, the container identification information IDC assigned to this ink cartridge 300 is transmitted together with the device identification information IDD and the user identification information IDU to the management unit 100 (refer to S230 in FIG. 2). However, if the newly installed ink cartridge 300 is present, the container identification information IDC may be transmitted without the device identification information IDD and the user identification information IDU to the management unit 100. For example, when the newly installed ink cartridge 300 is that for which an order has been placed by the user US through the printer 200 to the refiller RF, which is a maker, the refiller RF may perform the following processing. That is, in filling the ink cartridge 300 with ink, the refiller RF may store the container identification information IDC of the ink cartridge 300, the device identification information IDD, and the user identification information IDU in association with one another as the information set IS on the hard disk 120H. With such an association, even when receiving only the container identification information IDC, the management unit 100 may obtain the device identification information IDD and the user identification information IDU by referring to the information set IS.

(2) In the embodiment described above, if the trigger information It has been received, the output O140, which indicates that the ink cartridge 300 containing ink of the same color as that of ink in the ink cartridge 300 of the container identification information IDC included in the trigger information It is to be prepared, is displayed on the display 160. However, when the trigger information It is received, the CPU 110 of the management unit 100 may not perform such processing.

For example, if the trigger information It has been received, the CPU 110 of the management unit 100 may display, on the display 160, another plurality of pieces of container identification information IDC, which are associated with the user identification information IDU and which are assigned to the ink cartridges 300 of which the refiller RF is in possession, and the information on the type of ink of the ink cartridge 300 of the container identification information IDC included in the trigger information It. In addition, in accordance with these pieces of information, the refiller RF washes the ink cartridge 300 to which the container identification information IDC associated with the user identification information IDU is assigned and of which the refiller RF is in possession, and fills this ink cartridge 300 with ink of the displayed type to send the filled ink cartridge 300 to the user US.

B3. Third Other Embodiment

In the embodiment described above, if the trigger information It has been received, using the display 160, the CPU 110 of the management unit 100 provides the output O150 indicating that the ink cartridge 300 to which the container identification information IDC included in the trigger information It is assigned is to be collected from the user US (refer to S150 in FIG. 2 and FIG. 6). However, if the trigger information It has been received, the CPU 110 of the management unit 100 may not perform such processing. In such a case, the refiller RF may wait for receipt of the ink cartridge 300 dispatched from the user US.

B4. Fourth Other Embodiment

In the embodiment described above, if the amount of the ink IK is below the threshold Thik, using the display panel 260, the CPU 210 of the printer 200A provides the output O280 that prompts the user US of the printer 200A to dispatch the removed ink cartridge 300 to the refiller RF (refer to S280 in FIG. 2 and FIG. 4). However, if the amount of the ink IK is below the threshold Thik, the CPU 210 of the printer 200A may not perform such processing. In such a case, the user US may dispatch the ink cartridge 300 to the refiller RF after receiving a new ink cartridge 300 from the refiller RF.

B5. Fifth Other Embodiment

In the embodiment described above, in response to an instruction from the user US via the display panel 260, the CPU 210 of the printer 200A transmits, to the management unit 100, the inquiry information Ii including the device identification information IDD assigned to the printer 200A (refer to S410 in FIG. 7). Then, using the display panel 260, the CPU 210 of the printer 200A outputs one or more pieces of container identification information IDC included in the answer information Ia received from the management unit 100 (refer to S430 in FIG. 7 and FIG. 8). However, the CPU 210 of the printer 200A may not perform such processing. In such a case, the user US grasps and manages the state of the ink cartridge 300 in use by himself.

B6. Sixth Other Embodiment

In the embodiment described above, using the display panel 260, the CPU 210 of the printer 200A outputs, in accordance with the state information Is included in the answer information Ia, the states of the respective ink cartridges 300 of one or more pieces of container identification information IDC included in the answer information Ia (refer to S430 in FIG. 7 and FIG. 8). However, the CPU 210 of the printer 200A may not perform such processing. The CPU 210 of the printer 200A may output, for example, the container identification information IDC without information on the state of the ink cartridge 300 corresponding to each piece of container identification information IDC to the display panel 260.

C. Other Aspects

The present disclosure is not limited to the embodiments described above and may be implemented in various aspects without departing from the spirit and scope of the disclosure. For example, the present disclosure may be implemented in aspects that will be described below. The technical features in the embodiments described above corresponding to the technical features in the aspects described below may be appropriately replaced or combined in order to solve some or all of the issues of the present disclosure or to achieve some or all of the effects of the present disclosure. In addition, the technical features may be appropriately deleted unless they are described as essential features in the present specification.

(1) According to an aspect of the present disclosure, a consumables management system is provided. This consumables management system includes a plurality of printers in each of which a consumables container is installed and each of which is configured to consume consumables contained in the consumables container, and a management unit connected via a network to the plurality of printers. The management unit is configured to manage container identification information assigned to the consumables container, device identification information assigned to each of the plurality of printers, and user identification information assigned to the user of each of the plurality of printers in association with one another.

In such an aspect, a refiller who obtains a used consumables container and refills the consumables container with consumables may perform the following processing by using the consumables management system. That is, the consumables container refilled with consumables may be provided as a consumables container to be installed in a printer having device identification information associated with the container identification information of the consumables container to a user having user identification information associated with the container identification information of the consumables container. As a result, the user is provided with the consumables container that has been used by himself, instead of being provided with a consumables container of degraded quality because of use by another user.

(2) In the consumables management system according to the aspect described above, the consumables container may include a container storage storing the container identification information assigned to the consumables container; the printer may include a device storage storing the device identification information assigned to the printer and the user identification information assigned to the user of the printer, and a device output unit configured to output information; and the management unit may include a management storage storing a plurality of information sets, each of which includes a plurality of pieces of the container identification information, one or more pieces of the device identification information, and one piece of the user identification information in association with one another, and a management output unit configured to output information. The printer may be configured to, in response to the consumables container being installed in the printer, read out the container identification information in the container storage of the consumables container and transmit the container identification information, together with the device identification information assigned to the printer and the user identification information assigned to the user of the printer, to the management unit, and, when an amount of consumables contained in the consumables container installed in the printer is below a predetermined amount, using the device output unit, provide output that prompts the user of the printer to replace the consumables container installed in the printer, and transmit, to the management unit, trigger information including container identification information assigned to the consumables container in which the amount of contained consumables is below the predetermined amount. The management unit may be configured to, in response to receiving the trigger information, identify, in accordance with the information set in the management storage, the user identification information associated with the container identification information included in the trigger information, and provide, using the management output unit, output indicating that a consumables container to which another container identification information associated with the identified user identification information is assigned is to be prepared.

In such an aspect, when the amount of consumables contained in the consumables container installed in the printer is below the predetermined amount, the user of the printer may know that the consumables container is to be replaced. When the amount of consumables contained in the consumables container installed in the printer is below the predetermined amount, the refiller may know a consumables container to be prepared. As a result, the consumables containers may move efficiently and cyclically between the user and the refiller.

(3) In the consumables management system according to the aspect described above, the management unit may be configured to, in response to receiving the trigger information, provide, using the management output unit, output indicating that, in accordance with the information set in the management storage, the consumables container to which the container identification information included in the trigger information is assigned is to be collected from the user to whom the user identification information associated with the container identification information included in the trigger information is assigned.

In such an aspect, the refiller may know the consumables container to be collected from the user.

(4) In the consumables management system according to the aspect described above, when the consumables container installed in the printer is removed, the printer may be configured to provide, using the device output unit, output that prompts the user of the printer to dispatch the removed consumables container to a refiller who fills a consumables container with consumables.

In such an aspect, the user may know that the removed consumables container is to be dispatched to the refiller. As a result, the consumables containers may move efficiently and cyclically between the user and the refiller.

(5) In the consumables management system according to the aspect described above, the printer may be configured to transmit, to the management unit, inquiry information including the device identification information assigned to the printer, the management unit may be configured to, in response to receiving the inquiry information, transmit, to the printer, answer information including, in accordance with the information set in the management storage, one or more pieces of container identification information associated with the device identification information included in the inquiry information, and the printer may be configured to, in response to receiving the answer information, output, using the device output unit, the one or more pieces of container identification information included in the answer information.

In such an aspect, the user may know the consumables container associated with the printer.

(6) In the consumables management system according to the aspect described above, the answer information may include state information on a consumables container of a respective one of the one or more pieces of container identification information associated with the device identification information included in the inquiry information, the state information indicating one of a plurality of states including a state where a refiller is in possession of the consumables container and a state where the consumables container was dispatched to the user, and the printer may be configured to, in response to receiving the answer information, output, using the device output unit, the state indicated by the state information on the consumables container of the respective one of the one or more pieces of container identification information included in the answer information.

In such an aspect, the user may know the state of the consumables container that is associated with the printer and that is moving cyclically between the user and the refiller.

(7) According to another aspect of the present disclosure, a method for managing a consumables container executed in a consumables management system is provided. This consumables management system includes a plurality of printers in each of which a consumables container is installed and each of which is configured to consume consumables contained in the consumables container, and a management unit connected via a network to the plurality of printers. The management unit is configured to manage container identification information assigned to the consumables container, device identification information assigned to each of the plurality of printers, and user identification information assigned to a user of each of the plurality of printers in association with one another.

(8) In the method for managing a consumables container according to the other aspect described above, the consumables container may include a container storage storing the container identification information assigned to the consumables container; the printer may include a device storage storing the device identification information assigned to the printer and the user identification information assigned to the user of the printer, and a device output unit configured to output information; and the management unit may include a management storage storing a plurality of information sets, each of the information sets including a plurality of pieces of the container identification information, one or more pieces of the device identification information, and one piece of the user identification information in association with one another, and a management output unit configured to output information. The method may further include: (a) in response to the consumables container being installed in the printer, by the printer, reading out the container identification information in the container storage of the consumables container and transmitting the container identification information, together with the device identification information assigned to the printer and the user identification information assigned to the user of the printer, to the management unit; (b) when an amount of consumables contained in the consumables container installed in the printer is below a predetermined amount, (b1) by the printer, providing, using the device output unit, output that prompts the user of the printer to replace the consumables container installed in the printer, and (b2) by the printer, transmitting, to the management unit, trigger information including container identification information assigned to the consumables container containing consumables the amount of which is below the predetermined amount; and (c) when the management unit receives the trigger information, (c1) by the management unit, identifying, in accordance with the information set in the management storage, the user identification information associated with the container identification information included in the trigger information, and (c2) by the management unit, providing, using the management output unit, output indicating that a consumables container to which another container identification information associated with the identified user identification information is assigned is to be prepared.

(9) The method for managing a consumables container according to the other aspect described above may further include, when the management unit receives the trigger information, by the management unit, providing, using the management output unit, output indicating that, in accordance with the information set in the management storage, the consumables container to which the container identification information included in the trigger information is assigned is to be collected from the user to whom the user identification information associated with the container identification information included in the trigger information is assigned.

(10) The method for managing a consumables container according to the other aspect described above may further include, when the consumables container installed in the printer is removed, by the printer, providing, using the device output unit, output that prompts the user of the printer to dispatch the removed consumables container to a refiller who fills a consumables container with consumables.

(11) The method for managing a consumables container according to the other aspect described above may further include: by the printer, transmitting, to the management unit, inquiry information including the device identification information assigned to the printer; when the management unit receives the inquiry information, by the management unit, transmitting, to the printer, answer information including, in accordance with the information set in the management storage, one or more pieces of container identification information associated with the device identification information included in the inquiry information; and, when the printer receives the answer information, by the printer, outputting, using the device output unit, the one or more pieces of container identification information included in the answer information.

(12) In the method for managing a consumables container according to the other aspect described above, the answer information may include state information on a consumables container of a respective one of the one or more pieces of container identification information associated with the device identification information included in the inquiry information, the state information indicating one of a plurality of states including a state where a refiller is in possession of the consumables container and a state where the consumables container was dispatched to the user, and the outputting the one or more pieces of container identification information may include outputting, using the device output unit, a state indicated by the state information on a consumables container of a respective one of the one or more pieces of container identification information included in the answer information.

The present disclosure may be embodied in various forms other than the consumables management system and the method for managing a consumables container. For example, the present disclosure may be embodied in the forms such as a method for maintaining a consumables container, a computer program for implementing a method for managing a consumables container, and a non-transitory recording medium having recorded thereon the computer program.

What is claimed is:
1. A consumables management system comprising:
a plurality of printers in each of which a consumables container is installed and each of which is configured to consume consumables contained in the consumables container; and a management unit connected via a network to the plurality of printers, wherein the management unit is configured to manage container identification information assigned to the consumables container, device identification information assigned to each of the plurality of printers, and user identification information assigned to a user of each of the plurality of printers in association with one another, wherein the consumables container includes a container storage storing the container identification information assigned to the consumables container, the printer includes
a device storage storing the device identification information assigned to the printer and the user identification information assigned to the user of the printer, and
a device output unit configured to output information, the management unit includes
a management storage storing a plurality of information sets each of which includes a plurality of pieces of the container identification information, one or more pieces of the device identification information, and one piece of the user identification information in association with one another, and
a management output unit configured to output information, the printer is configured to
in response to the consumables container being installed in the printer, read out the container identification information in the container storage of the consumables container and transmit the container identification information, together with the device identification information assigned to the printer and the user identification information assigned to the user of the printer, to the management unit, and
when an amount of consumables contained in the consumables container installed in the printer is below a predetermined amount,
using the device output unit, provide output that prompts the user of the printer to replace the consumables container installed in the printer, and
transmit, to the management unit, trigger information including container identification information assigned to the consumables container in which the amount of contained consumables is below the predetermined amount, and the management unit is configured to, in response to receiving the trigger information,
identify, in accordance with the information set in the management storage, the user identification information associated with the container identification information included in the trigger information, and
provide, using the management output unit, output indicating that a consumables container to which another container identification information associated with the identified user identification information is assigned is to be prepared.

2. The consumables management system according to claim 1, wherein the management unit is configured to, in response to receiving the trigger information, provide, using the management output unit, output indicating that, in accordance with the information set in the management storage, the consumables container to which the container identification information included in the trigger information is assigned is to be collected from the user to whom the user identification information associated with the container identification information included in the trigger information is assigned.

3. The consumables management system according to claim 1, wherein when the consumables container installed in the printer is removed, the printer is configured to provide, using the device output unit, output that prompts the user of the printer to dispatch the removed consumables container to a refiller who fills a consumables container with consumables.

4. The consumables management system according to claim 1, wherein the printer is configured to transmit, to the management unit, inquiry information including the device identification information assigned to the printer, the management unit is configured to, in response to receiving the inquiry information, transmit, to the printer, answer information including, in accordance with the information set in the management storage, one or more pieces of container identification information associated with the device identification information included in the inquiry information, and the printer is configured to, in response to receiving the answer information, output, using the device output unit, the one or more pieces of container identification information included in the answer information.

5. The consumables management system according to claim 4, wherein the answer information includes state information on a consumables container of a respective one of the one or more pieces of container identification information associated with the device identification information included in the inquiry information, the state information indicating one of a plurality of states including a state where a refiller is in possession of the consumables container and a state where the consumables container was dispatched to the user, and the printer is configured to, in response to receiving the answer information, output, using the device output unit, the state indicated by the state information on the consumables container of the respective one of the one or more pieces of container identification information included in the answer information.

6. A method for managing a consumables container executed in a consumables management system, the consumables management system including
a plurality of printers in each of which a consumables container is installed and each of which is configured to consume consumables contained in the consumables container, and
a management unit connected via a network to the plurality of printers, the method further comprising:
managing, by the management unit, container identification information assigned to the consumables container, device identification information assigned to each of the plurality of printers, and user identification information assigned to a user of each of the plurality of printers in association with one another, wherein the consumables container includes a container storage storing the container identification information assigned to the consumables container, the printer includes
a device storage storing the device identification information assigned to the printer and the user identification information assigned to the user of the printer, and a device output unit configured to output information, and the management unit includes a management storage storing a plurality of information sets each of which includes a plurality of pieces of the container identification information, one or more pieces of the device identification information, and one piece of the user identification information in association with one another, and a management output unit configured to output information, the method further comprising:

(a) in response to the consumables container being installed in the printer, by the printer, reading out the container identification information in the container storage of the consumables container and transmitting the container identification information, together with the device identification information assigned to the printer and the user identification information assigned to the user of the printer, to the management unit, (b) when an amount of consumables contained in the consumables container installed in the printer is below a predetermined amount, (b1) by the printer, providing, using the device output unit, output that prompts the user of the printer to replace the consumables container installed in the printer, and (b2) by the printer, transmitting, to the management unit, trigger information including container identification information assigned to the consumables container containing consumables the amount of which is below the predetermined amount, and (c) when the management unit receives the trigger information, (c1) by the management unit, identifying, in accordance with the information set in the management storage, the user identification information associated with the container identification information included in the trigger information, and (c2) by the management unit, providing, using the management output unit, output indicating that a consumables container to which another container identification information associated with the identified user identification information is assigned is to be prepared.

7. The method according to claim 6, further comprising:

when the management unit receives the trigger information, by the management unit, providing, using the management output unit, output indicating that, in accordance with the information set in the management storage, the consumables container to which the container identification information included in the trigger information is assigned is to be collected from the user to whom the user identification information associated with the container identification information included in the trigger information is assigned.

8. The method according to claim 6, further comprising:

when the consumables container installed in the printer is removed, by the printer, providing, using the device output unit, output that prompts the user of the printer to dispatch the removed consumables container to a refiller who fills a consumables container with consumables.

9. The method according to claim 6, further comprising:

by the printer, transmitting, to the management unit, inquiry information including the device identification information assigned to the printer;

when the management unit receives the inquiry information, by the management unit, transmitting, to the printer, answer information including, in accordance with the information set in the management storage, one or more pieces of container identification information associated with the device identification information included in the inquiry information; and when the printer receives the answer information, by the printer, outputting, using the device output unit, the one or more pieces of container identification information included in the answer information.

10. The method according to claim 9, wherein the answer information includes state information on a consumables container of a respective one of the one or more pieces of container identification information associated with the device identification information included in the inquiry information, the state information indicating one of a plurality of states including a state where a refiller is in possession of the consumables container and a state where the consumables container was dispatched to the user, and the outputting the one or more pieces of container identification information includes outputting, using the device output unit, a state indicated by the state information on a consumables container of a respective one of the one or more pieces of container identification information included in the answer information.

* * * * *